(12) United States Patent
Krieger et al.

(10) Patent No.: US 10,823,995 B2
(45) Date of Patent: Nov. 3, 2020

(54) FRAME FOR AN INPUT AND OUTPUT DEVICE AND METHOD FOR MANUFACTURING THE FRAME

(71) Applicant: Siemens Aktiengesellschaft, Munich (DE)

(72) Inventors: Harald Krieger, Neuhaus (DE); Ulrich Ringer, Amberg (DE); Christian Daubenmerkl, Hehnbach (DE); Alfredo Hummel, Burglengenfeld (DE); Heinrich Schlichting, Wenzenbach (DE); Andreas Traub, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/360,847

(22) Filed: Mar. 21, 2019

(65) Prior Publication Data

US 2019/0293988 A1   Sep. 26, 2019

(30) Foreign Application Priority Data

Mar. 22, 2018   (EP) .................................... 18163373

(51) Int. Cl.
*G02F 1/1333*   (2006.01)
*B29C 48/07*   (2019.01)
(Continued)

(52) U.S. Cl.
CPC .... *G02F 1/133308* (2013.01); *B29C 48/0019* (2019.02); *B29C 48/07* (2019.02); *G06F 1/1601* (2013.01); *G02F 2001/133325* (2013.01)

(58) Field of Classification Search
CPC . G02F 1/133308; A47G 1/0605; A47G 1/101; A47G 1/10
See application file for complete search history.

(56) References Cited

U.S. PATENT DOCUMENTS 2,045,770 A * 6/1936 Golden ................ A47G 1/0605
40/786
3,802,105 A * 4/1974 Bendix ................ A47G 1/0605
40/785
(Continued)

FOREIGN PATENT DOCUMENTS

CN   2844970   12/2006
CN   102256456   11/2011
(Continued)

*Primary Examiner* — Gary C Hoge
(74) *Attorney, Agent, or Firm* — Cozen O'Connor

(57) ABSTRACT

A frame for an input and output device with four corners, which has a first leg and a second leg, where a strip is arranged on the first leg, open spaces are arranged in the frame profile to form the four corners such that the strip remains standing in the region of the open space, and a groove is arranged on the second leg, and where a respective corner element is arranged in each of the four corners, and each respective corner element has an element body with a first element leg and a second element leg, and where the first and second element legs are arranged substantially at right angles to one another on the element body and the corner elements are arranged in the open spaces such that the first second element legs are each arranged in the groove of the frame profile.

8 Claims, 8 Drawing Sheets

(51) Int. Cl.
   *B29C 48/00*      (2019.01)
   *G06F 1/16*       (2006.01)

(56) References Cited

U.S. PATENT DOCUMENTS

| | | | |
|---|---|---|---|
| 2002/0041482 A1* | 4/2002 | Sun | G06F 1/1601 361/679.02 |
| 2010/0225845 A1* | 9/2010 | Liu | G02F 1/133308 349/58 |
| 2014/0055929 A1* | 2/2014 | Sato | H05K 7/18 361/679.01 |
| 2014/0354916 A1 | 12/2014 | Kuroyanagi | |
| 2016/0366773 A1 | 12/2016 | Esterbauer et al. | |

FOREIGN PATENT DOCUMENTS

| | | |
|---|---|---|
| EP | 2881781 | 6/2015 |
| EP | 3106915 | 12/2016 |
| JP | 2014063195 | 4/2014 |
| KR | 20050027375 | 3/2005 |

* cited by examiner

FRAME FOR AN INPUT AND OUTPUT DEVICE AND METHOD FOR MANUFACTURING THE FRAME

BACKGROUND OF THE INVENTION

1. Field of the Invention

The invention relates to a frame for an input and output device with four corners and also to an input and output device for industrial use with the frame, and to a method for manufacturing a frame for an input and output device, where a frame profile is used which has a first leg and a second leg, and where arranged on the first leg is a strip and arranged on the second leg is a groove.

2. Description of the Related Art

The majority of modern input and output devices which have a human-machine interface (HMI) are based on a combination of a display and a touch-screen technology in the form of input and output units.

Particularly due to the use of input and output devices in conjunction with the use in industry, the requirements for such devices in the industrial setting have risen accordingly in terms of mechanical robustness and resilience with respect to the external influences and circumstances. These requirements can in no way be compared with the requirements on conventional input and output devices, in particular displays as found in the private setting in monitors and televisions, for example.

Usually, input and output devices for industrial use are designed such that correspondingly stable and resilient housings or frames are provided for the input and output devices. For this reason, device frames are preferably made of metal, in particular aluminum, for input and output devices used in industry.

Furthermore, there are requirements for a seal tightness with regard to dust and splashing water. In an industrial setting, a display must be able to withstand being subjected to splashing or spraying water, such as when cleaning a machine. Often, requirements of a hygienic nature also exist. Here, possibilities for dirt deposits on the display are to be avoided as far as possible in particular. In this context, channels, gaps and recesses on the display or on the display frame are to be avoided above all.

In order to be able to meet all these requirements, in accordance with the current prior art, input and output devices are produced with a display for industrial applications, preferably with a single-part frame that accommodates the display. On the one hand, this single-part frame can be manufactured by an injection molding process with a mold as a tool, or even produced from a complete material, such as by milling. Here, this naturally results in very high material losses to start with, which increases the costs for such display frames and also makes the production elaborate and inefficient. In an injection molding process in a mold for a frame, enormous costs have to be provided for an injection molding tool in advance. If there is only a low quantity of input and output units with a frame of this kind, then the previously known production process is no longer economical.

CN 28 449 70 Y discloses a frame for an LCD display which is composed of individual frame parts.

KR 10 2005 0027375 A discloses a frame for a flat-screen display which is composed of individual frame parts.

EP 3 106 915 A1 likewise discloses a frame composed of individual profile parts.

SUMMARY OF THE INVENTION

It is an object of the present invention to manufacture a frame for an input and output device, preferably for industrial use, as cost-effectively as possible, and moreover to dispense with additional gaps or channels in the frame.

This and other objects and advantages are achieved in accordance with the invention by a frame for an input and output device with four corners is provided, where a frame profile formed in one piece is used. The frame profile has a first leg and a second leg, where a strip is arranged on the first leg, and where open spaces are arranged in the frame profile to form the four corners such that the strip remains standing in the region of the open spaces, and a groove is arranged on the second leg, where a corner element is arranged in each of the corners, and the corner element has an element body with a first element leg and a second element leg, where the element legs are arranged substantially at right angles to one another on the element body and the corner elements are arranged in the open spaces such that the first element leg and the second element leg are each arranged in the groove of the frame profile. A frame of this kind has the advantage that it is formed in one piece and does not, as in the prior art, consist of four individual frame elements. If the one-piece frame profile is bent to form a frame with four corners, then the corners must be overbent in order to overcome a residual stress in the material and thus to prevent the sides of the frame from springing back to their original positions. If the specified open spaces are correspondingly generously open-milled in the frame profile, then it is possible to overbend the corners without a subsequent spring-back. The subsequent insertion of the corner elements brings the required stability for the frame.

In a further embodiment of the invention, the corner elements are formed such that the element legs are arranged at a lower end of the element body and an element head is arranged at an upper end of the element body. Here, the element body is formed at the head such that it closes off the open space in the corners such that a flat surface is present on the first leg within the frame for applying a seal and/or adhesive surface for the subsequent introduction of a contact surface. The element head is thus formed such that it reaches flush up to the strip and already provides a preliminary stage for a continuous adhesive surface or device seal assembly surface, whereby, e.g., a level of sealing in accordance with the norm IP 65 or comparable is made possible.

Advantageously, the strip is formed as an upper circumferential collar for the frame and the seal, which seals off the intermediate space between the surface of the first leg and a boundary surface of the contact surface to be subsequently introduced, is arranged in the upper circumferential collar.

Furthermore, it is advantageous if the strip is additionally formed as a lower circumferential collar for the frame and a further seal, which seals off the intermediate space between a lower surface of the first leg and a boundary surface of an installation cutout, is arranged in the lower circumferential collar. If the frame is now mounted in an installation cutout, then the further seal can be used to seal off the frame from the wall when wall-mounting, for example.

Advantageously, the frame profile has a retaining groove with an indentation in the second leg, in order to fasten a clamp for installation in the installation cutout in the retaining groove. When wall-mounting, the clamp would press against the interior of the wall and thus hold the frame firmly in the installation cutout.

A particularly favorable production of a frame profile is achieved by an aluminum continuous casting profile production.

The frame demonstrated in the introduction is advantageously used in an input and output device for use in industry.

It is also an object of the invention to provide a method in which a frame profile is that formed in one piece is used. In the method for manufacturing the frame for an input and output device, a frame profile is used which has a first leg and a second leg, where a strip is arranged on the first leg and a groove is arranged on the second leg, where in a first step a length, which corresponds to the subsequent circumference of the frame, is cut to length by a frame profile, and in a second step, in accordance with the subsequent side lengths of the frame, open spaces are introduced in the frame profile to form the four corners such that the strip stands in the region of the cutouts resulting from the open spaces, the size of the open spaces is chosen/selected/established such that an overbending required in the subsequent step can succeed without interference, in a third step the corners are bent at the points of the open spaces, in which context the respective sides adjoining a corner are overbent slightly beyond an angle of 90° to overcome a residual stress in the material and thus to prevent the sides from springing back. In a fourth step, a corner element is then inserted into corners in each case, where the corner element has an element body with a first element leg and a second element leg, and where the element legs are substantially arranged at right angles to one another on the element body and the corner elements are inserted into the open spaces such that the first element leg and the second element leg are each arranged in the groove of the frame profile. Afterwards, a remaining impact face is then welded together. Advantageously, this has now resulted in a frame that, in particular, has no channels and rims at the corners but rather has an accordingly modern design.

In a further method step, a corner element is advantageously used, in which the element legs are arranged at an upper end of the element body and an element head is arranged at an upper end of the element body, where the element head is placed in the corners in the open space such that it closes this off flushly, i.e., a flat surface is created on the first leg within the frame for applying a seal and/or adhesive surface for the subsequent introduction of a contact surface.

The method in accordance with the invention has a plurality of advantages compared to the conventional manufacturing process. It is thus possible, on the one hand, to dispense with an elaborate die casting process and, on the other, it is not necessary to procure unique die casting tools for individual different frame sizes. By way of the above-proposed solution method in accordance with the invention, frames for front frames for displays can be produced in any given size. The use of die casting tools is not necessary, meaning that ultimately the costs for manufacturing a single frame are considerably reduced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing presents an exemplary embodiment of the invention, in which.

DETAILED DESCRIPTION OF THE EXEMPLARY EMBODIMENTS

Figure 1:
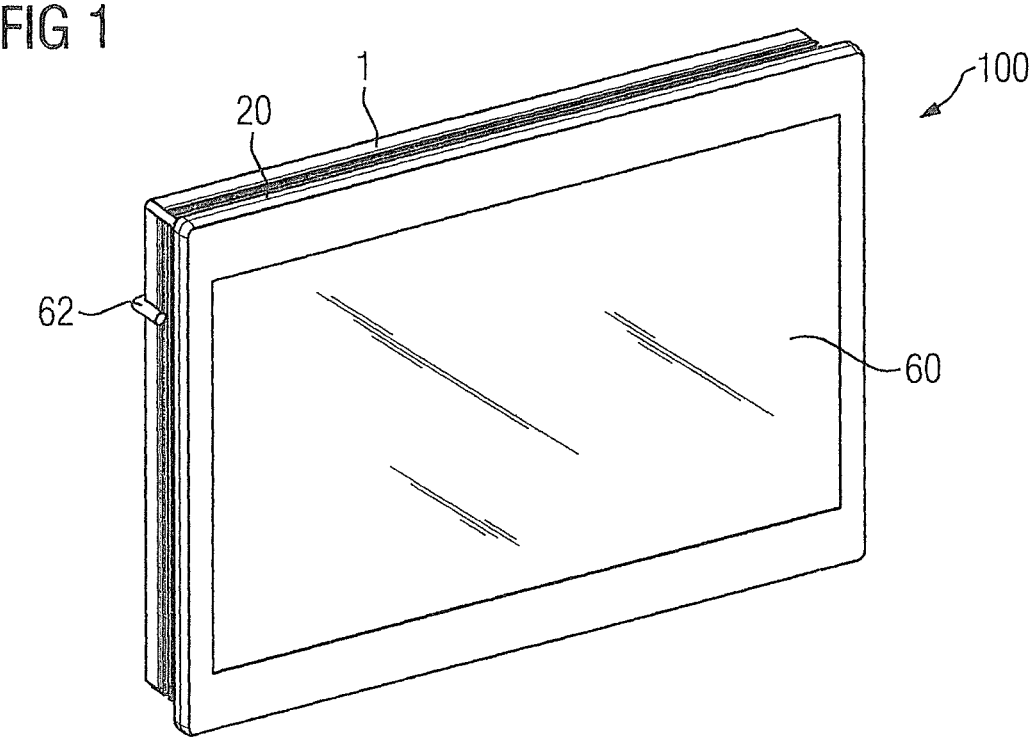
FIG. 1 shows an input and output device in the form of a touch panel PC.

As shown in FIG. 1, an input and output device 100 is represented in the form of a touch panel PC. The input and output device 100 has a contact surface 60 as a touch screen. The touch screen is enclosed in a frame 1, which is produced from a frame profile 10. For a subsequent mounting in an installation cutout, a retaining groove 22, in which a clamp 62 is arranged, is incorporated in the frame profile.

Figure 2:
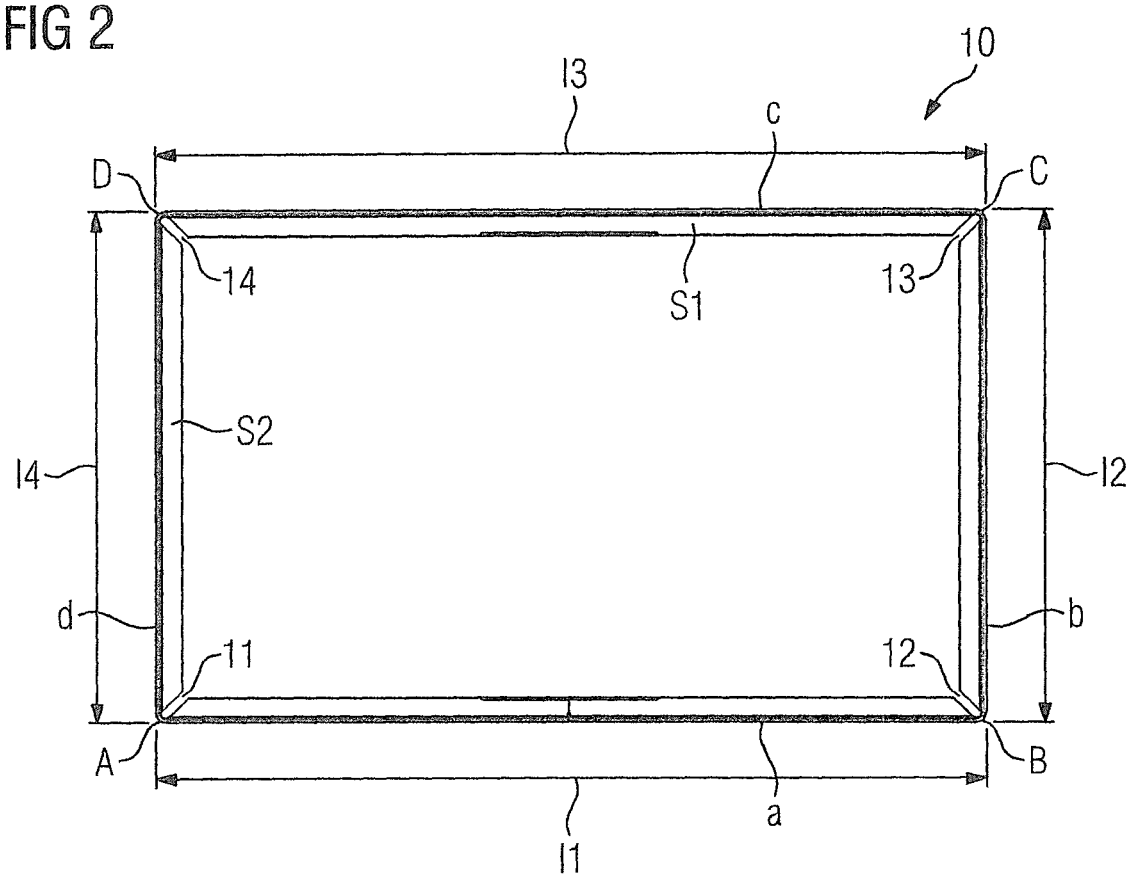
FIG. 2 shows an already bent frame with four corners.

A frame 1 for the input and output device 100 shown in accordance with FIG. 1 is shown by FIG. 2 with four corners A,B,C,D. In accordance with the invention, the frame profile 10 is formed in one piece, in which case the frame profile 10 has a first leg S1 and a second leg S2. A flat strip 20 is arranged on the first leg S1. The strip 20 is later used as a circumferential, rounded-off device rim. Open spaces 11,12, 13,14 are arranged in the frame profile 10 to form the four corners A,B,C,D such that the strip 20 remains standing in the region of the open spaces 11,12,13,14. Arranged on the second leg S2 is a groove 21 (see FIG. 4).

Figure 3:
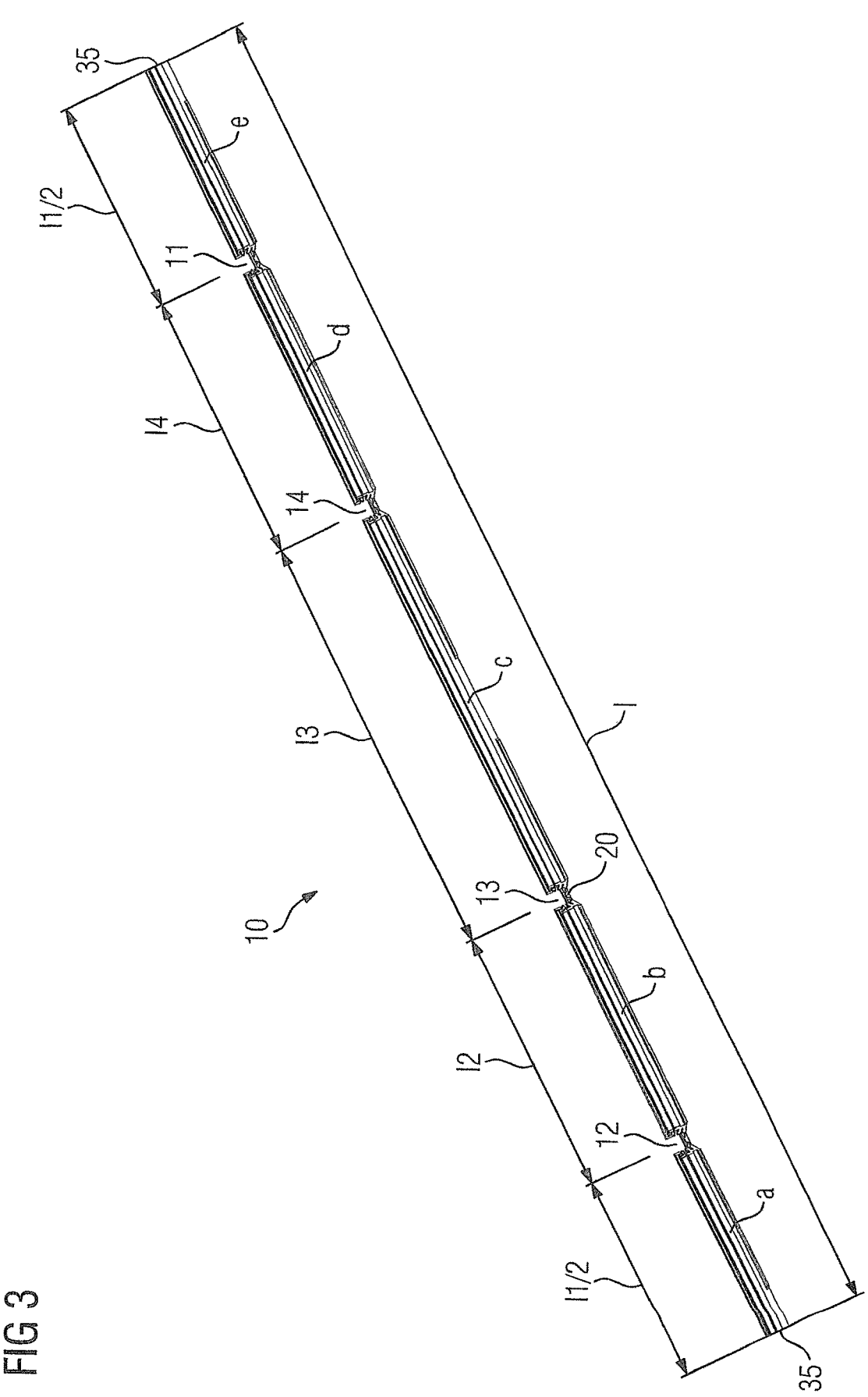
FIG. 3 shows a frame profile extending lengthwise with corresponding cut-out open spaces.

The manufacture of a frame 1 in accordance with FIG. 2 is explained below with the aid of FIG. 3. In accordance with FIG. 3, a frame profile 10 extending lengthwise is shown. The frame profile 10 has an overall length l that corresponds with the subsequent circumference of the frame 1. According to this, the frame profile 10 is now subdivided into five sections. The first section and the last section are each half the length of a first side a and are therefore half as long as the length l1. The second section corresponds to the side b and has the length l2. The third section corresponds to the third side c and has the length l3 and the fourth section corresponds to the side d and has the length l4. In accordance with the invention, a length l, which corresponds to the subsequent circumference of the frame 1, is cut to length accordingly by a frame profile 10. Following this, in accordance with the subsequent side lengths l1,l2,l3,l4 of the frame 1, open spaces 11,12,13,14 are introduced into the frame profile 10 to form the four corners A,B,C,D such that the strip 20 remains standing in the region of the cutouts resulting from the open spaces 11,12,13,14. The size of the open spaces 11,12,13,14 is chosen/selected/established such a manner that the overbending required in a subsequent step can succeed without interference.

Figure 4:
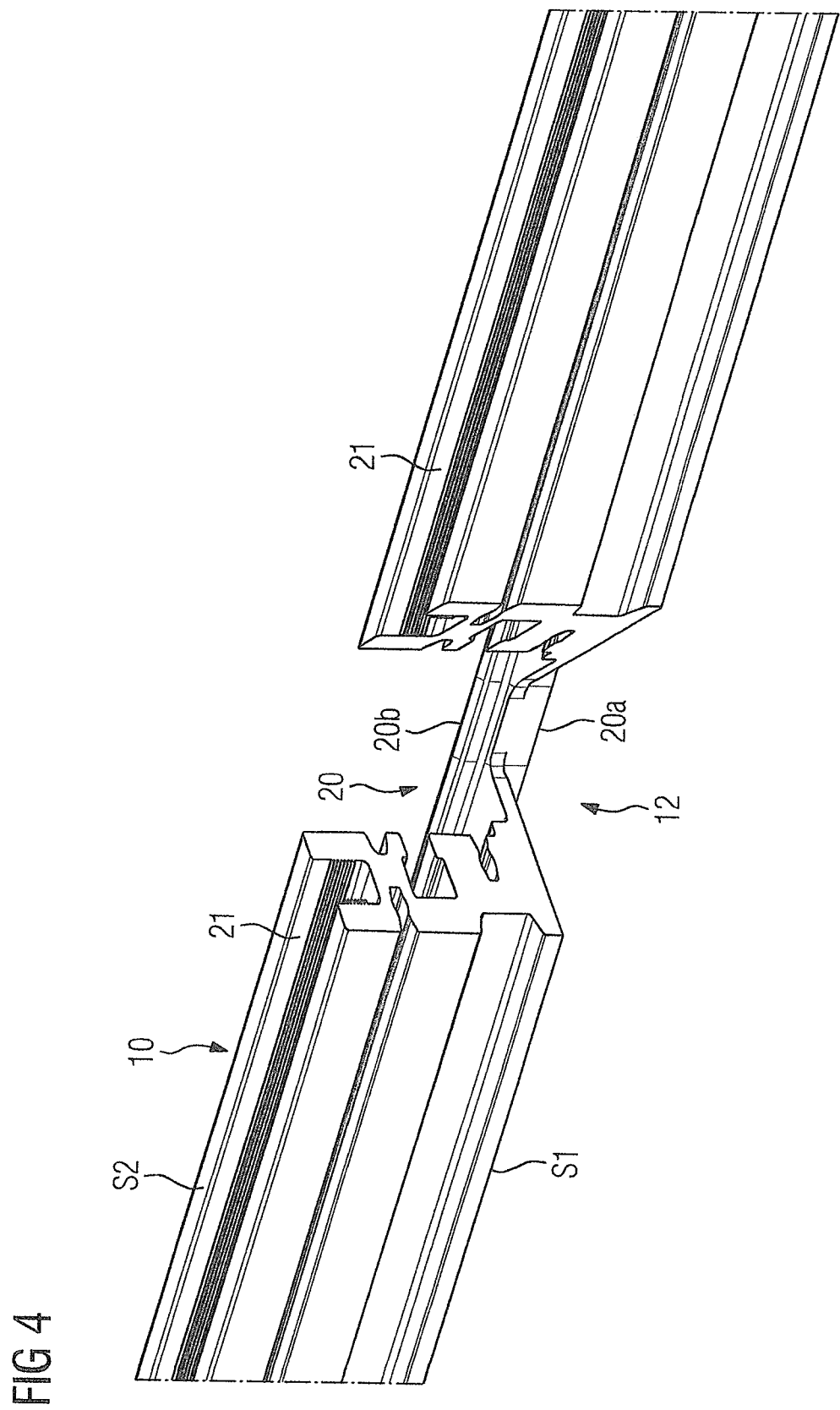
FIG. 4 shows a detailed representation of a cut-out open space in the frame profile.

With reference to FIG. 4, by way of example, the second open space 12 associated with the second corner B is shown in a detailed representation. Here, the frame profile 10 shows the first leg S1 and the second leg S2 more clearly. The material is substantially milled out from the frame profile 10 for the open space 12 such that the circumferential strip 20 remains standing as the subsequent rounded-off frame. The open space 12 is milled out from the frame profile 10 as one segment. The strip 20 thus forms an upper circumferential collar 20a and a lower circumferential collar 20b. Furthermore, the frame profile 10 has the groove 21 already addressed for the subsequent insertion of a corner element 32.

Figure 5:
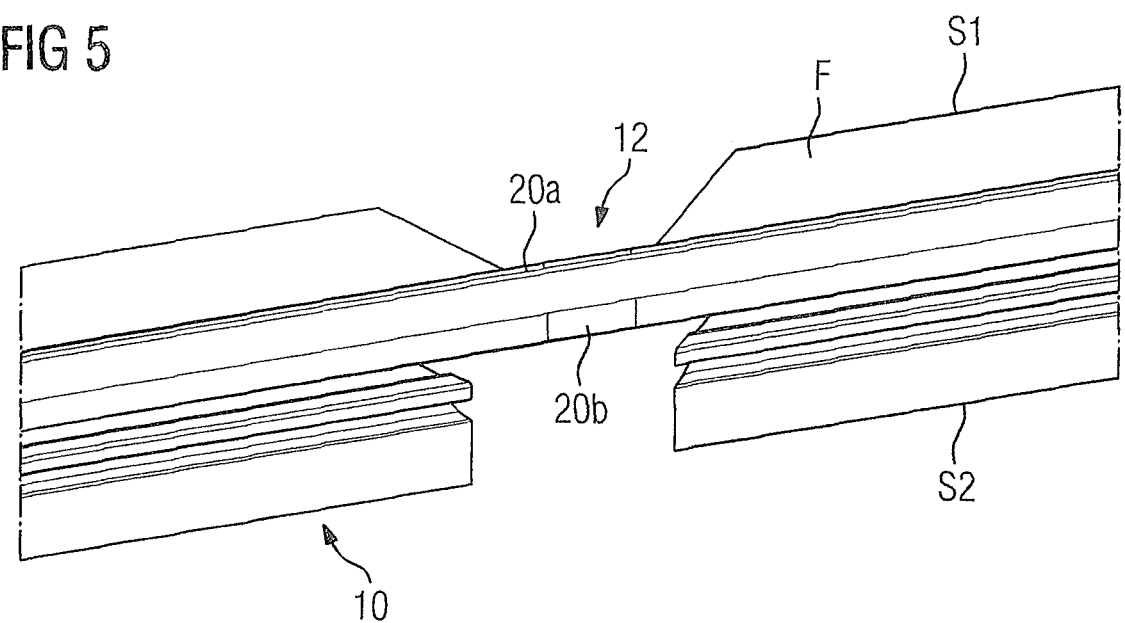
FIG. 5 shows another representation of the cut-out open space shown in FIG. 4.

FIG. 5 shows the detailed representation known from FIG. 4 in another view. Here, it can be seen once more that the strip 20 forms an upper circumferential collar 20a and a lower circumferential collar 20b, where the strip 20 is formed such that its outer contour is rounded off. A surface F of the first leg S1 subsequently forms a surface F for applying a seal 50 and/or an adhesive surface 51 for introducing a contact surface 60. For example, the contact surface 60 then corresponds to the touch screen in front of a display 61 (see FIG. 10).

Figure 6:
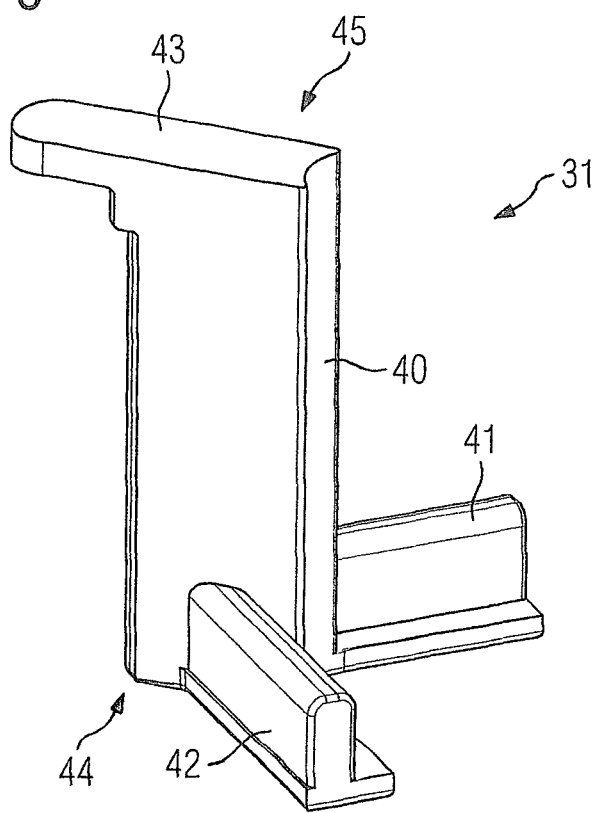
FIG. 6 shows one of four corner elements.

The first corner element 31 is shown in FIG. 6. The corner elements 31,32,33,34 are arranged in the open spaces 11,12, 13,14 of the bent frame profile 10 and thus increase the stability of the frame 1. The corner element 31 has an element body 40 with a first element leg 41 and a second element leg 42. The element legs 41,42 are arranged substantially at right angles to one another at a lower end 44 of the element body 40. An element head 43 is arranged at an upper end 45 of the element body 40. In the state in which it is inserted into the frame, the element head 43 is used to close off the free spaces 11,12,13,14 resulting from the milling out of the frame profile 10. As a result of its element legs 41,42 being wedged in the groove 21 of the frame profile 10, the stability of the frame 1 is furthermore increased.

Figure 7:
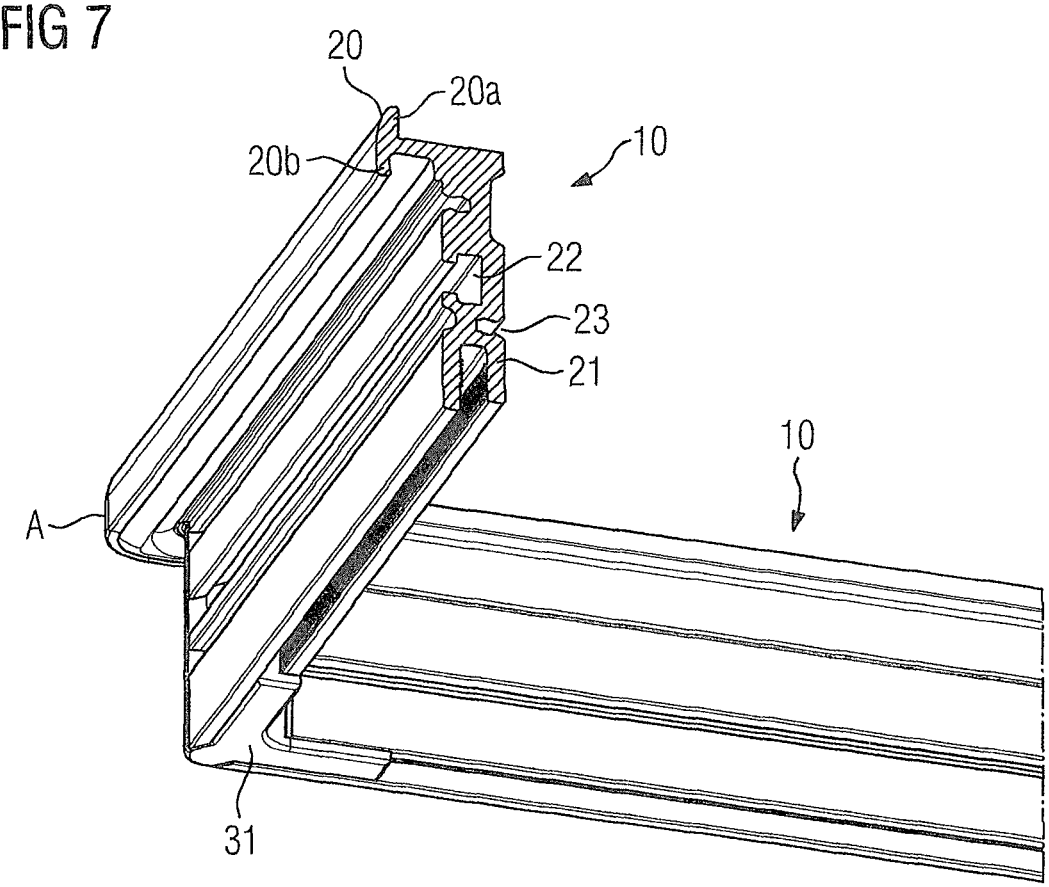
FIG. 7 shows a cross-section of a cutout of the frame for clarifying the structure of the frame profile.

FIG. 7 shows the frame 1 with the frame profile 10 in a perspective cross-sectional representation. A first corner element 31 is inserted in the first corner A. The section through the frame profile 10 shows the circumferential strip 20 with its upper circumferential collar 20a and its lower circumferential collar 20b. The retaining groove 22 introduced in the second leg has an indentation, in order to be able to fasten a clamp 62 in the retaining groove 22 at a later time. It is not only the element legs 41,42 that come to lie in the groove 21 at the corners, but rather a rear wall hood 57 (see FIG. 10), which can consist of a plate bent around at the edges, can also be inserted into the groove 21 in conclusion.

Figure 11:
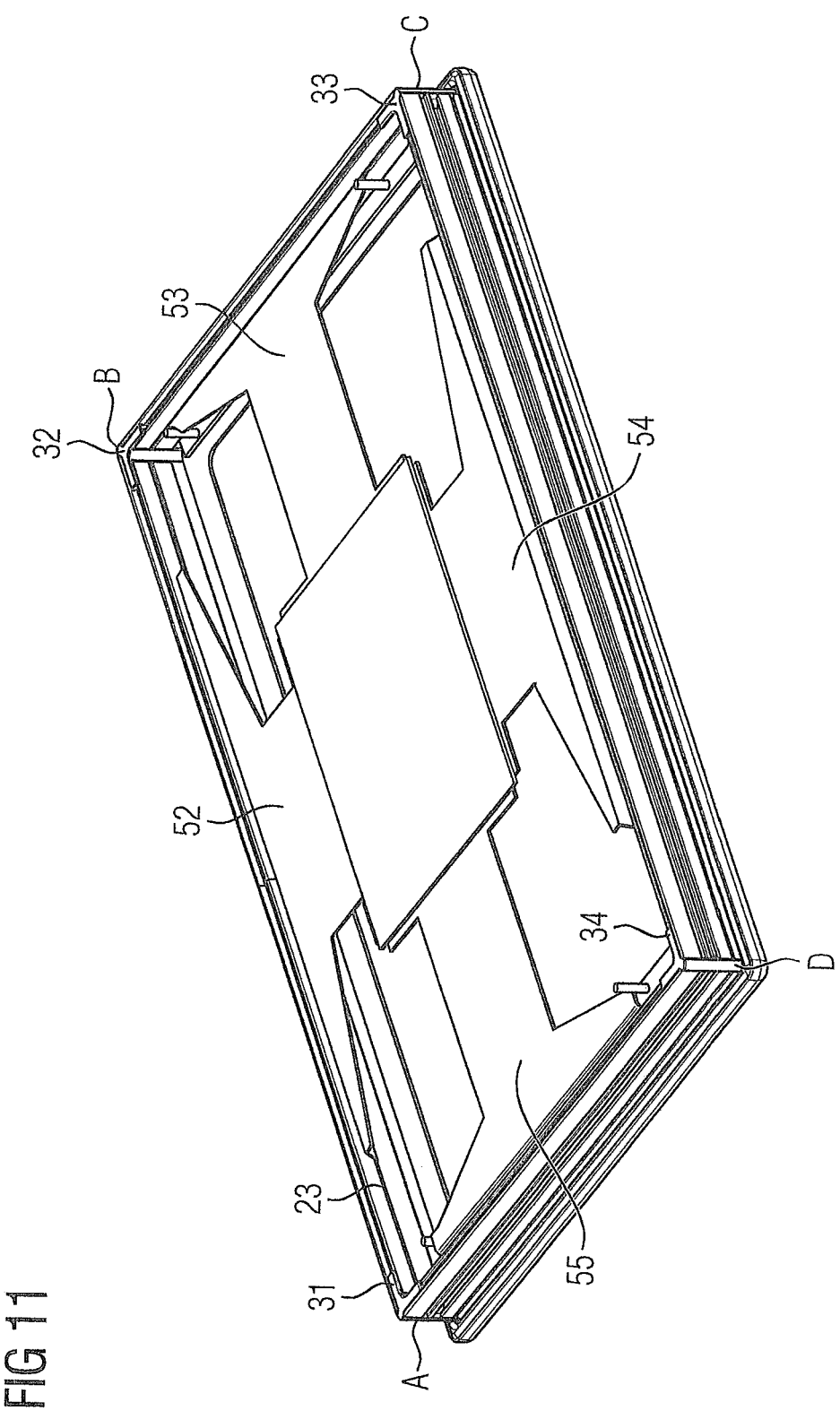
FIG. 11 shows the input and output device in a perspective rear view with a representation of retaining and mounting surfaces.

In addition, the frame profile 10 has a mounting plate groove 23 for mounting plates 52,53,54,55 (see FIG. 11).

Figure 8:
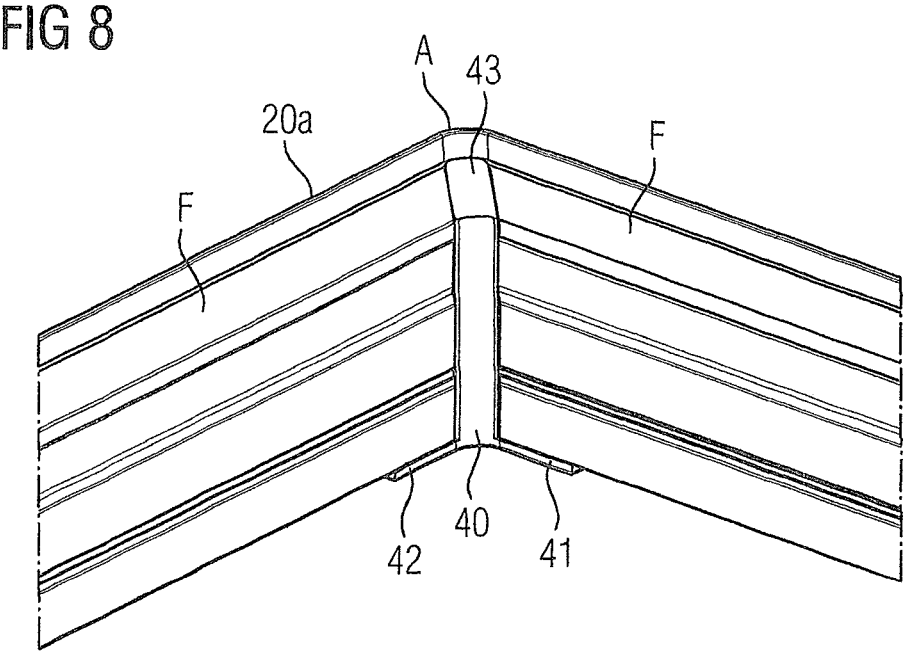
FIG. 8 shows a cutout of the frame of the corner A for clarifying the inserted corner element.

In FIG. 8, a detailed representation of the first corner element 31 inserted into the first corner A is once again illustrated. A seal 50 and an adhesive surface 51 will subsequently come to lie on the surface F. The inserted corner element 31 is used together with its element head 43 for the clean and flush closing off of the open space 11 in the frame profile 10 created by the milling out.

Figure 9:
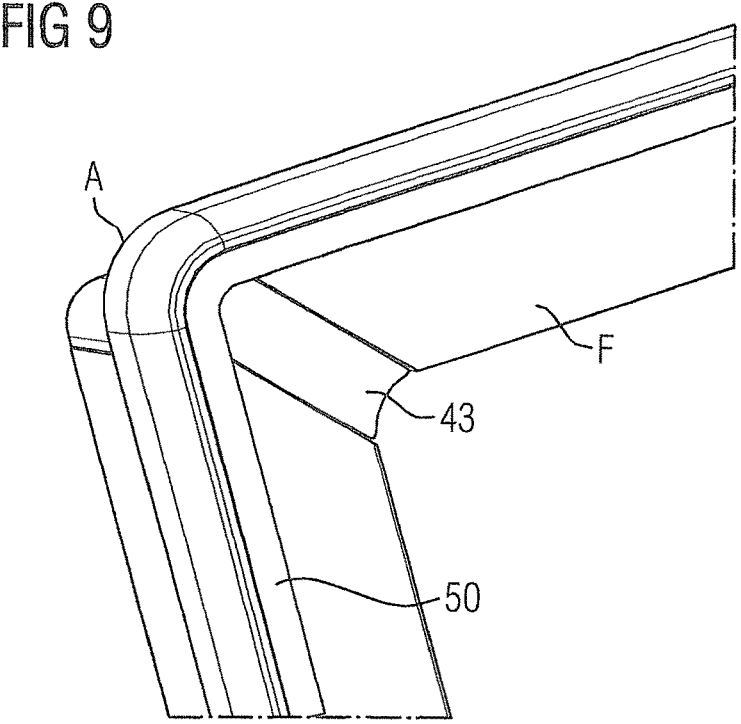
FIG. 9 shows the corner element shown in FIG. 8 with a seal arranged thereabove.

For clarification, FIG. 9 shows the seal 50 inlaid into the first corner A. The seal 50 clings to the upper circumferential collar 20a formed by the strip 20 and as a result an intermediate space between the surface F and a contact surface 60 subsequently inlaid is sealed via the seal 50.

Figure 10:
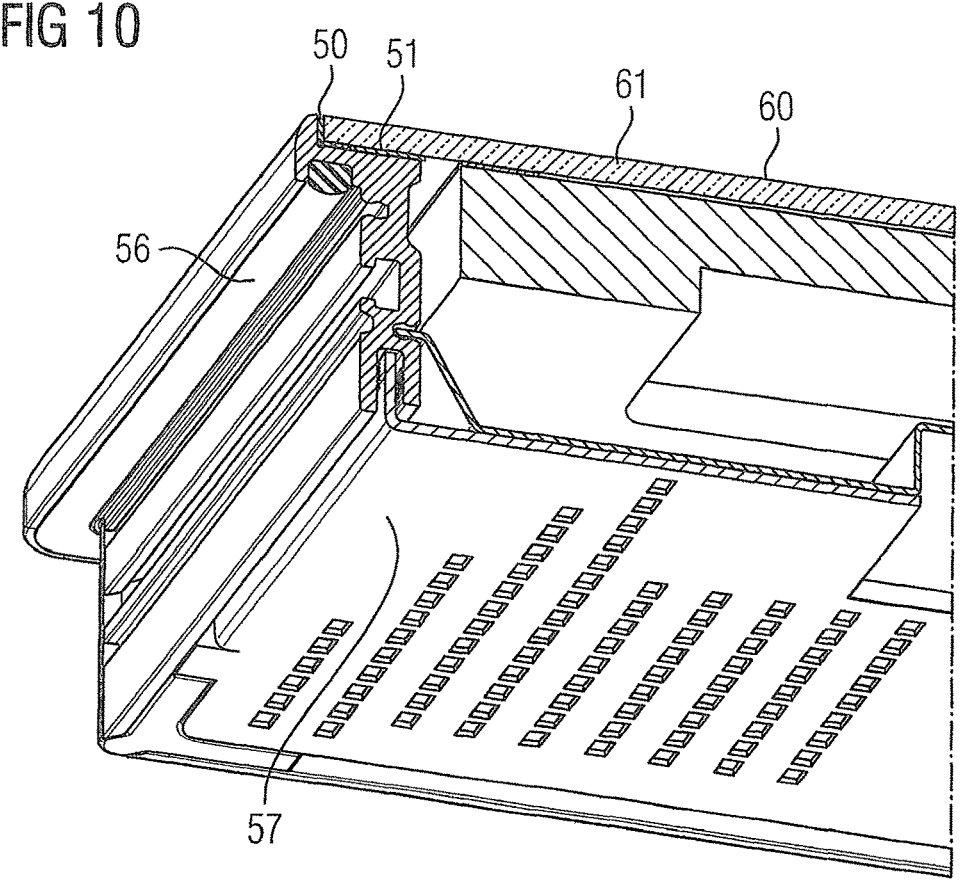
FIG. 10 shows a sectional representation of the input and output device.

FIG. 10 shows a sectional representation of an input and output device 100. For wall-mounting or mounting in a console within an installation cutout, the frame 1 has a further seal 56 at its lower circumferential collar 20a. The seal 50 and an adhesive surface 51, to which the contact surface 60 is adhesively attached, are attached to the surface F of the frame 1. Arranged below the contact surface 60 is a display 61, whereby a touch-screen display is formed.

FIG. 11 shows a further advantage of the frame profile 10, as the frame profile 10 has an additional circumferential mounting plate groove 23, with a first mounting plate 52, a second mounting plate 53, a third mounting plate 54 and a fourth mounting plate 55 being able to be arranged in the mounting plate groove 23. The mounting plates 52,53,54 and 55 are combined at the center and are used as a support for a printed circuit board.

Figure 12:
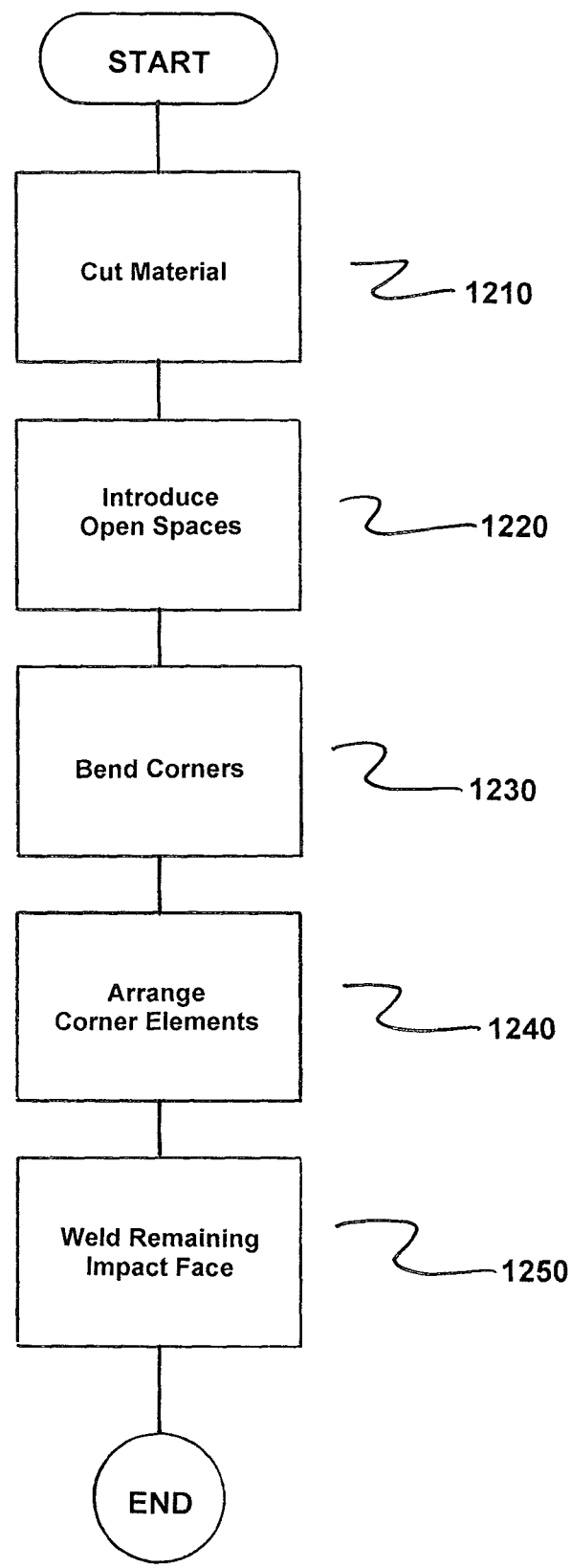
FIG. 12 is a flowchart of the method in accordance with the invention.

FIG. 12 is a flowchart of a method for manufacturing a frame 1 for an input and output device 100, where a frame profile 10 is utilized that includes a first leg S1 and a second leg S2, a strip 20 is arranged on the first leg S1 and a groove 21 is arranged on the second leg S2. The method comprises cutting a length l, which corresponds to a subsequent circumference of the frame 1, by a frame profile 10, as indicated in step 1210.

Next, open spaces 11,12,13,14 are introduced into the frame profile 10 in accordance with subsequent side lengths l1,l2,l3,l4 of the frame 1 to form four corners A,B,C,D such that the strip 20 stands in a region of cutouts resulting from the introduced open spaces 11,12,13,14, as indicated in step 1220. In accordance with the invention, the size of the introduced open spaces 11,12,13,14 is established such that any required overbends in a subsequent step occur without interference.

Next, the four corners A,B,C,D are bent at points of the introduced open spaces 11,12,13,14, as indicated in step 1230. In accordance with the invention, the sides a,b,c,d adjoining a respective corner A,B,C,D are respectively bent over beyond an angle of 90° to overcome the stress in the material and to prevent the sides a,b,c,d from springing back to their original position.

Next, a respective corner element 31,32,33,34 is arranged in each respective corner of the four corners A,B,C,D, as indicated in step 1240. In accordance with the invention, the corner element 31,32,33,34 includes an element body 40 having a first element leg 41 and a second element leg 42, the first and second element legs 41,42 are arranged substantially at right angles to one another on the element body 40 and respective corner elements 31,32,33,34 are arranged in the open spaces 11,12,13,14 such that the first element leg 41 and the second element leg 42 are each arranged in the groove 21 of the frame profile 10.

Next, the remaining impact face 35 is welded together after arrangement of the respective corner elements 31,32, 33,34 in the respective corners of the four corners A,B,C,D, as indicated in step 1250.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

What is claimed is:

1. A frame for an input and output device having four corners, the frame comprising:
   a frame profile formed in one piece, which has a first leg and a second leg;
   a strip arranged on the first leg, open spaces being arranged in the frame profile to form the four corners such that the strip is left standing in a region of the open spaces; and
   a groove arranged on the second leg;
   wherein a corner element is arranged in each of the corners, and the corner element includes an element body with a first element leg and a second element leg which are arranged substantially at right angles to one another on the element body; and
   wherein the corner elements are arranged in the open spaces such that the first element leg and the second element leg are each arranged in the groove of the frame profile.

2. The frame as claimed in claim 1, wherein the first and second element legs are arranged at a lower end of the element body and an element head is arranged at an upper end of the element body; and
   wherein the element head is formed to close off the open space in the four corners such that a flat surface is present on the first leg within the frame for application of at least one of (i) a seal and (ii) adhesive surface for subsequent introduction of a contact surface.

3. The frame as claimed in claim 2, wherein the strip is formed as an upper circumferential collar for the frame and the seal, which seals off an intermediate space between the surface of the first leg and a boundary surface of the contact surface to be subsequently introduced, is arranged in said upper circumferential collar.

4. The frame as claimed in claim 2, wherein the strip is formed as a lower circumferential collar for the frame and a further seal, which seals off an intermediate space between a lower surface of the first leg and a boundary surface of an installation cutout, is arranged in said lower circumferential collar.

5. The frame as claimed in claim 3, wherein the strip is formed as a lower circumferential collar for the frame and a further seal, which seals off an intermediate space between a lower surface of the first leg and a boundary surface of an installation cutout, is arranged in said lower circumferential collar.

6. The frame as claimed in claim 4, further comprising:
   a retaining groove including an indentation arranged in the second leg, which is formed such that a clamp for installation in the installation cutout is to be fastened therein.

7. The frame as claimed in claim 1, wherein the frame profile is formed by an aluminum continuous casting profile.

8. An input and output device for industrial use, comprising the frame as claimed in claim 1.

* * * * *